United States Patent [19]
Maggio

[11] Patent Number: 5,526,683
[45] Date of Patent: Jun. 18, 1996

[54] METHOD AND APPARATUS FOR DETERMINING THE FULLNESS AND EMPTINESS OF SILOS

[76] Inventor: Louis Maggio, 32 Marion St., Greenvale, N.Y. 11548

[21] Appl. No.: 353,958

[22] Filed: Dec. 12, 1994

Related U.S. Application Data

[63] Continuation of Ser. No. 943,727, Sep. 11, 1992, abandoned.

[51] Int. Cl.⁶ .................................................. G01F 17/00
[52] U.S. Cl. ............................................................ 73/149
[58] Field of Search .............................. 73/149, 290 B, 73/866.2

[56] References Cited

U.S. PATENT DOCUMENTS

| | | | |
|---|---|---|---|
| 3,744,306 | 7/1973 | Krueger | 73/149 |
| 4,553,431 | 11/1985 | Nicolai | 73/149 |
| 4,598,591 | 7/1986 | Baud | 73/149 |
| 4,770,033 | 9/1988 | Nicolai | 73/149 |
| 4,840,064 | 6/1989 | Fudim | 73/149 |

*Primary Examiner*—Richard Chilcot
*Assistant Examiner*—William L. Oen
*Attorney, Agent, or Firm*—Bauer & Schaffer

[57] ABSTRACT

The degree to which a large container such as a silo is full or empty is determined by expelling a quantity of air under pressure into the top of the silo. The pressure of the air within the silo is then measured and the rate of decay of said pressure from its maximum to atmosphere is determined.

1 Claim, 2 Drawing Sheets

METHOD AND APPARATUS FOR DETERMINING THE FULLNESS AND EMPTINESS OF SILOS

This is a continuation of Ser. No. 07/943,727, filed Sep. 11, 1992, now abandoned.

BACKGROUND OF THE INVENTION

The present invention is directed to a process and apparatus for determining the volumetric contents of large size silos.

It is known to store grains and similar granular products in large silos. For example, sugar is stored in silo vessels something of the size of 10 stores tall (85 feet) with a base approximately 22 foot diameter. Similar silos are used to store grain, chemical compositions or other powder and highly granular materials. Because of the size of the silos in which the material is stored, it is virtually impossible to determine readily the depth to which the material fills the silo, that is, the volume of materials actually contained in the silo. This problem is exacerbated by the fact that highly granular and powdery materials produce a great deal of dust which prevents clear visual determination of the depth of the material. Another problem in determining such volume of material is the fact that the upper surface is not uniform, nor is it constant and therefore even if one was capable of visually determining the height of the material in the silo, it would not be an accurate indication.

At the present time the method used to determine the depth to which a silo of this type is filled is for a person to climb the 10 stories to the top of the silo, which is itself a dangerous task since such silos are freestanding, and once having reached the top of the silo to drop a plumb consisting of a heavy rock or similar stone tethered at the end of a long rope until it comes to rest on the upper surface of the material in the silo. This technique, similar to that used by Samuel Clemens in his role as riverboat captain to plumb the depths of the Mississippi, is just as ancient in its approach as it is inaccurate. Notwithstanding the fact that it is common to make such a measurement at least once every four hours, the actual volume of the material in the silo is never truly determined. This is a very big problem because as the silos are being emptied, from the bottom, in order to process the powdered material, they are being refilled from the top. Any misadjustment in the ratio of output to input can have disastrous results, particularly since most powdered materials in such high quantities present both not only a health hazard, but also a fire and explosion hazard from the dust created and by any possible overflow.

It is therefore an object of the present invention to provide a system for determining the contents of a large size silo which does not require manual measurement.

It is a further object of the present invention to provide a system for the measurement of powdered or granular material in large size silos which can be made automatically and at regular and fixed intervals, or even when the interval is desired at a selected time.

It is an important aspect of the present invention to provide a system of the type described in which the dangers inherent from a health point of view, as well as from a physical explosive and fire hazard, are eliminated.

SUMMARY OF THE INVENTION

The concept behind the system is for a small period of time a tank silo with a vent will act like a closed vessel. Thus, if a known quantity of air at a known pressure is released into the tank the pressure in the tank will increase a small amount. By measuring the rate of decay of the pressure and comparing it to a standard, the remaining empty volume and the level of the material in the tank can be determined.

Accordingly, the present invention provides a simple method whereby a fixed volume of air under a fixed pressure, is released virtually instantaneously, into the silo above the material being measured, and the rate of decay of the pressure within the silo is measured by a simple pressure sensor transducer. That rate translated into the time it takes from the pressure to decay from the maximum pressure to atmospheric pressure is the measure of the quantity of materials in the silo, or as desired, the volume of the silo still empty.

The advantages of the present invention lie in the fact that no manual labor is required to climb the height of the silo and/or to drop a plumb therein. Nor is any hazardous material used to determine the measurement. Only air at an ambient temperature is introduced into the silo, which air further tends to mix with the dust or fine grains existing in the silo to reduce the effect of such dust particles.

Full details of the present invention are set forth in the following disclosure and illustrated in the accompanying drawing.

DESCRIPTION OF THE PREFERRED EMBODIMENT OF THE PRESENT INVENTION

Figure 1:
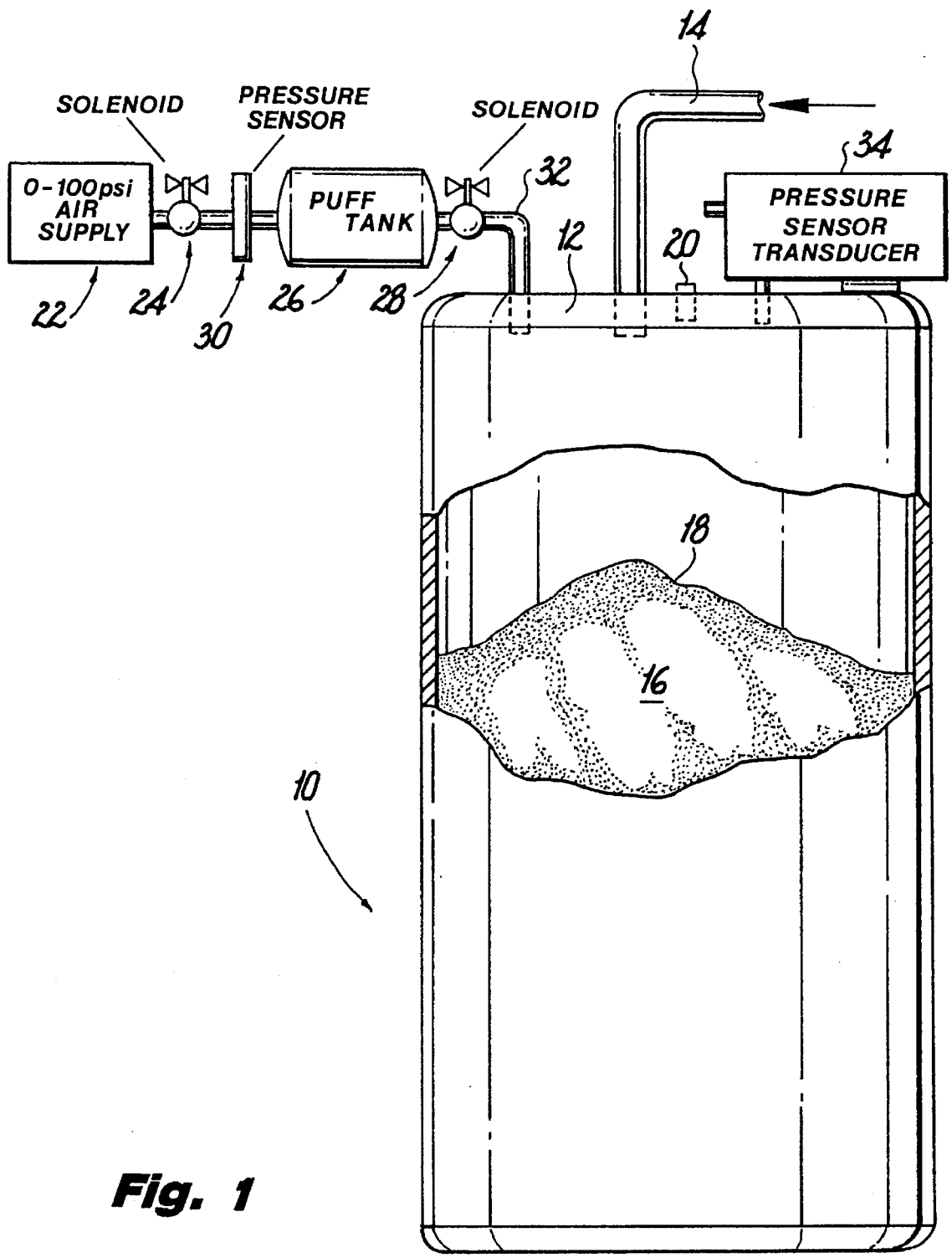
FIG. 1 is a schematic view of the apparatus of the present invention applied to a silo, partially in section illustrating both the apparatus and the method of the invention.

Turning to FIG. 1, a conventional silo, for example, housing granulated sugar, is illustrated by the numeral 10. The silo 10 is, in general, a cylindrical body having a cover 12 at its top into which an inlet feedpipe 14, is arranged to fill the silo with granulated material 16. At the bottom of the silo are suitable conduits and openings (not shown) for the retrieval of the sugar or other material to be passed to the refining process or other treatment stages. The level of the material, e.g., sugar, in the silo, is illustrated by its surface 18 which will be observed as the normal dome shaped and/or irregular shaped contours created by the dumping of the granulated material through the upper inlet opening. While the volume of the container above the surface 18 of the material in the silo 10 is shown clear, it will be understood that under normal conditions there will exist in this area a high number of dust particles created by the fact that some particles of the material are lighter than air and therefore will float in the silo. Normally a small air vent hole 20 of approximately ½ inch diameter is provided in the cover 12.

The process steps of the present invention and the apparatus will be described together for convenience. Air under pressure is fed from source 22 through a valve 24 into a high pressure chamber 26 denoted here as "puff tank" for reasons that will become obvious. The puff tank 26 is of fixed volume and its output conduit is fixed volume, closed by a second valve 28. The source of air is caused to fill the fixed volume of puff tank 26 until a preselected pressure accumulates within the puff tank 26 as sensed by a pressure sensor 30 upstream of the tank. After reaching the desired pressure the first valve 24 is closed thereby maintaining the fixed volume puff tank charged at the predetermined pressure.

To insure for safety, the upstream pressure sensor 30 also constitutes a pressure relief valve. Leading from the fixed puff tank via the second valve 30 is a conduit 32 which passes directly into the upper end of the silo 10. A pressure sensor transducer 34 capable of sensing small variations in pressure within the silo, and producing an electric signal indicative thereof is mounted also on the cover 12. The transducer 34 is capable of sensing pressures between 0–1.0 psi and produce an electric signal indicative thereof. This electric signal is sent to a microprocessor in which microprocessor is produced in regular, uniform intervals preferably in nano seconds, a readout of the actual pressure sensed at each interval. These readouts are recorded within the microprocessor and displayed on a video display. The microprocessor provided with a program produces a recorded table, graph or the like from the instant of maximum pressure within the silo to the instant wherein the pressure within the silo returns to atmosphere. The microprocessor is further programmed to calculate the time it takes for the pressure in the silo to decay from the maximum pressure to the atmospheric pressure. This time is translated and comparison to by previously calculated or empirical devised evidence into a determination of the height of the material in the silo and/or conversely to the empty volume in the silo.

While the ratio of the fixed volume charging puff tank 26 to the silo 10 may, of course, be varied as desired, it has been found that a ratio of 1 to 3200 provides a very effective and efficient apparatus. That is, the silo can be 400 times greater than that of the puff tank. For example, the fix volume vessel can be of the size of 10 cu. ft., while the silo can have approximately 32,000 cubic feet size. Thus, the total apparatus needed to sense and determine the amount of the material in the silo is relatively small and will not require any rebuilding of the storage facilities and/or of the existing silo.

High pressure accumulating air chambers of 60, 80 and 100 gs/feet are readily available and these may be readily and easily adapted for the purpose of the present process. Further, high pressure valves or sources of air under pressure commonly found in factories or storage facilities as reaching 100 pounds per square inch are also available. The conduit between the puff tank and the silo can easily be in terms of three inch piping and may be mounted within a few feet or inches of the silo. Thus, under these conditions the passage of the high pressure air from the accumulating chamber to the silo can be measured in a period of microseconds as a result of which virtually all the air in the accumulating chamber, at its highest pressure is instantaneously introduced into the silo.

Figure 2:
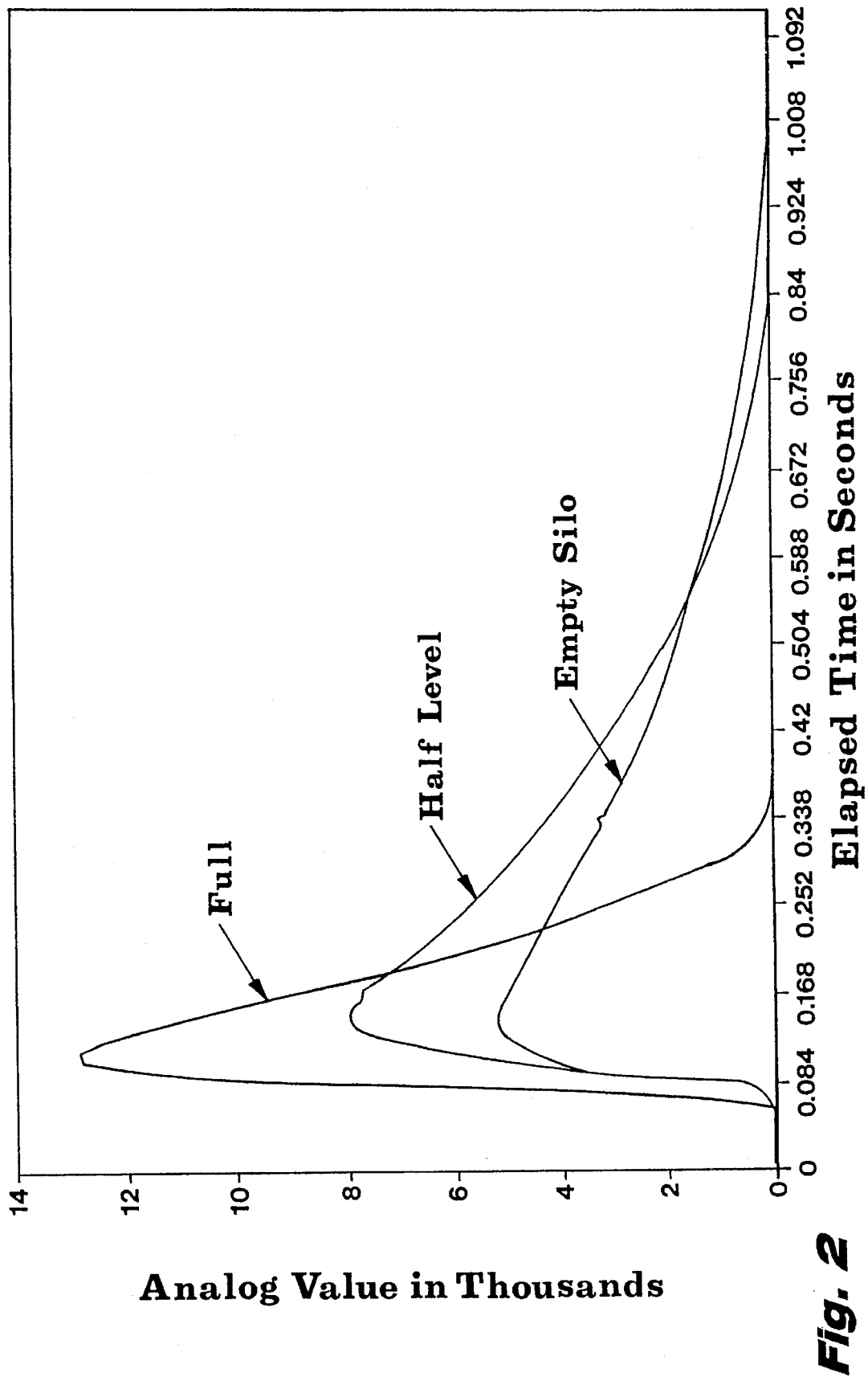
FIG. 2 is a graph operation of the present invention.

In FIG. 2 the pressure curve sensed within the silo is shown. With a period of approximately two seconds, the injected pressure is sensed rising to a maximum and then decaying. The curves represent the pressure at empty, half full and full silo content. Numerous tests were conducted at each level of the silo to verify the accuracy of the reading.

The tests have shown that the plots of the pressure in the tank versus time were almost identical each time the experiment was tried so that repeatability was very good. The graphs also showed that if the known pressure was varied in the puff tank, the corresponding peak lowered. However, we observed from the graphs that the slope of the decay line of the pressure remained the same from the turn around point to almost the bottom.

When calculating the decay slope of all the tests, it was found that there was a relationship between all the decays based on the same volume.

The information was entered into a program and an equation was derived to allow the level to be calculated based on the 160 continuous readings taken as the burst of air was released into the tank.

Verification of the results were confirmed in two silos of widely divergent size.

|  | Silo I |  | Silo II |  |
| --- | --- | --- | --- | --- |
|  | Empty | | | |
| Height | 85 | ft | Height | 10 ft |
| Width | 21.5 | ft | Width | 1 ft |
| Volume | 30859.27 | CuFt | Volume | 7.85391 CuFt |
| Instantaneous | 0.029553 | Psi | Instantaneous | 0.089454 Psi |
| Peak Silo Pressure | 1.528212 | mmHg | Peak Silo Pressure | 4.625695 mmHg |
|  | Not Empty | | | |
| Height Empty | 10 | ft | Height Empty | 1.176470 ft |
| Width | 21.5 | ft | Width | 0.958333 ft |
| Volume Empty | 3630.503 | CuFt | Volume Empty | 0.848602 CuFt |
| Instantaneous | 0.251204 | Psi | Instantaneous | 0.892359 Psi |
| Peak Silo Pressure | 0.251204 | mmHg | Peak Silo Pressure | 0.892359 mmHg |
| Puff Pressure in Tank | 114 | Psi | Puff Pressure in Tank | 112 Psi |
| Puff Tank | 80 | Gal | Puff Diameter | 1.375 In |
| Puff Volume | 10.7 | CuFt | Puff Length + Sol | 7.3 In |
|  |  |  | Puff Volume | 0.006272 CuFt |
| Opening at Top of Silo | 10 | In | Opening at Top of Silo | 0.465116 In |

The programmable control or microprocessor control is relatively simple. The signal from the pressure sensor 34 is fed to the computer where it is sampled approximately every 7 milliseconds, the samples are sequentially recorded and thereafter compared to a stored predetermined set of values obtained by prior testing. The result of the comparison is then deployed on a video screen or on a printer. Preferably, the comparison is best made by the use of an algorithm.

I claim:

1. A method for determining the degree to which a silo open at its top to ambient atmosphere is empty and/or filled with content comprising the steps of storing externally of said silo a predetermined quantity of air under pressure greater than the ambient, instantly expelling said predetermined quantity of air under pressure into the top of said silo, said predetermined quantity of air acting prior to escaping through the opening at the top of the silo to momentarily raise the pressure of air with the top of said silo above the ambient, and thereafter as said predetermined quantity of air escapes from the silo repetitively measuring the pressure of the air in the top of said silo and determining the rate of decay of said pressure to atmosphere, said determination being indicative of the emptiness and/or fullness of said silo.

* * * * *